(12) United States Patent
Huang

(10) Patent No.: US 7,631,967 B1
(45) Date of Patent: Dec. 15, 2009

(54) EYEGLASS NOSE-PAD, EYEGLASS ASSEMBLY AND FABRICATING METHOD OF THE SAME

(75) Inventor: Shu-Han Huang, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 12/177,953

(22) Filed: Jul. 23, 2008

(51) Int. Cl.
   *G02C 5/12* (2006.01)

(52) U.S. Cl. .......................... 351/138; 351/78; 351/80; 351/86; 351/106; 351/136

(58) Field of Classification Search .................. 351/138, 351/136, 78, 80, 86, 106, 137, 139, 65, 69, 351/70, 71, 72, 76, 79, 81, 41
See application file for complete search history.

(56) References Cited

U.S. PATENT DOCUMENTS

| | | | |
|---|---|---|---|
| 4,464,025 A | 8/1984 | Lhospice | |
| 4,527,871 A | 7/1985 | Sohyer | |
| 4,556,300 A | 12/1985 | Dietrich | |
| 5,007,726 A | 4/1991 | Suzuki et al. | |
| 5,428,410 A * | 6/1995 | Lei | 351/47 |
| 5,526,070 A | 6/1996 | Simioni | |
| 5,581,312 A * | 12/1996 | Chen | 351/138 |
| 5,689,835 A | 11/1997 | Chao | |
| 5,737,055 A * | 4/1998 | Dittmeier | 351/138 |
| 6,283,592 B1 | 9/2001 | Lin | |
| 6,340,228 B1 | 1/2002 | Cummings et al. | |
| 6,364,480 B1 * | 4/2002 | Chen | 351/138 |
| 6,386,705 B1 | 5/2002 | Chen | |
| 6,568,806 B1 | 5/2003 | Lin | |
| 6,644,806 B2 | 11/2003 | Wu | |
| 6,886,935 B2 | 5/2005 | Negishi et al. | |
| 6,896,365 B1 | 5/2005 | Lin | |
| 6,976,756 B1 | 12/2005 | Chen | |
| 7,086,734 B2 | 8/2006 | Chen | |
| 7,314,277 B2 | 1/2008 | Lin | |
| 7,347,545 B1 | 3/2008 | Jannard et al. | |
| 7,484,843 B1 * | 2/2009 | Lin | 351/80 |

\* cited by examiner

*Primary Examiner*—Hung X Dang
(74) *Attorney, Agent, or Firm*—Rosenberg, Klein & Lee

(57) ABSTRACT

This invention is related to an eyeglass nose-pad, an eyeglass assembly and fabricating methods of the same, the eyeglass assembly comprises a glass frame, a lens and a pair of nose-pads. The glass frame has a frame member including a groove for receiving the lens. A nose bridge extends outward from a center of the glass frame and has a pair of forks. The lens is received in the groove of the frame member and has protruding columns toward the forks so that accommodating spaces are defined between the protruding columns and the nose bridge. The lens may be an integral lens or a pair of separate lenses. The nose-pads made of a resilient material are received in the accommodating spaces. The nose-pad has an opening facing the fork of the nose bridge for receiving the fork and apertures facing the lens for being combined with the protruding columns of the lens.

18 Claims, 10 Drawing Sheets

Providing a glass frame 31 that has an upper frame member 311 formed with a downward groove 313 for receiving a lens 32 and has a nose bridge 34 extending downward from a center of the upper frame member 311 and having a pair of forks 343;

↓

Providing the lens 32 that is upwardly assembled to the groove 313 of the upper frame member 311 of the glass frame 31 and has a plurality of protruding columns 321 extending from a lower edge thereof toward the forks 343 of the nose bridge 34 so that accommodating spaces are defined between the protruding columns 321 and the nose bridge 34; and

↓

Providing a pair of nose-pads 33 that is settled in the accommodating spaces and each has an opening 331 facing the fork 343 of the nose bridge 34 for receiving the fork 343 and a plurality of apertures 332 facing the lens 32 for being combined with the protruding columns 321 of the lens 32.

Fig. 9

Providing a glass frame 31 that has a lower frame member 312 formed with an upward groove 313 for receiving a lens 32 and has a nose bridge 34 extending upward from a center of the lower frame member 312 and having a pair of forks 343;

↓

Providing the lens 32 that is downwardly assembled to the groove 313 of the lower frame member 312 of the glass frame 31 and has a plurality of protruding columns 321 extending toward the forks 343 of the nose bridge 34 so that accommodating spaces are defined between the protruding columns 321 and the nose bridge 34; and

↓

Providing a pair of nose-pads 33 that is made of a resilient material and settled in the accommodating spaces wherein each of the nose-pads 33 has an opening 331 facing the fork 343 of the nose bridge 34 for receiving the fork 343 and a plurality of apertures 332 facing the lens 32 for being combined with the protruding columns 321 of the lens 32.

Fig. 10

EYEGLASS NOSE-PAD, EYEGLASS ASSEMBLY AND FABRICATING METHOD OF THE SAME

BACKGROUND OF THE INVENTION

1. Technical Field

The present invention relates to an eyeglass assembly and a method of fabricating the same. More particularly, the present invention relates to a nose-pad of an eyeglass assembly.

2. Description of Related Art

Please refer to FIG. 1 for a conventional eyeglass assembly 40 that primarily comprises a glass frame 41, lenses 42 and a nose-pad set 43. A pair of forks 44 is deposited at a center of the frame 41 for providing a plurality of protruding columns 441 for being received in a plurality of corresponding cavities 431 preformed on the nose-pad set 43. Then the integrated nose-pad set 43 and the frame 41 can be fixedly combined by filling adhesive between the cavities 431 and the protruding columns 441. In Taiwan Patent No. M265628, a nose-pad assembling method has been taught. However, the prior art device is disadvantaged by that the nose-pad set tends to come off the protruding columns and adhesive overflow between the nose-pad and the frame adversely affects the appearance of the entire eyeglass assembly. Hence, it is a task for the manufactures to fulfill to devise a nose-pad free from the problems of coming-off and adhesive overflow.

SUMMARY OF THE INVENTION

In the attempt to solve the foregoing problems of the prior art device, the present invention herein provides an eyeglass assembly that is primarily composed of a glass frame, a lens and a pair of nose-pads. The glass frame has an upper frame member having a downward groove for receiving a lens. Moreover, a nose bridge extends downward from a center of the upper frame member and has a pair of forks. The lens is upwardly assembled to the groove of the upper frame member of the glass frame and has a plurality of protruding columns extending from a lower edge of the lens toward to the forks of the nose bridge so that accommodating spaces are defined between protruding columns and the nose bridge. In nature, the lens may be an integral lens or a pair of separate lenses. The pair nose-pads are made of a resilient material and settled in the accommodating spaces. Each said nose-pad has an opening facing the fork of the nose bridge for receiving the fork and has a plurality of apertures facing the lens for being combined with the protruding columns of the lens.

Therefore, one objective of the present invention is to provide an eyeglass assembly wherein nose-pads thereof do not easily come off and a firmness of the assembled eyeglass assembly is enhanced.

Another objective of the present invention is to provide an eyeglass assembly wherein adhesive overflow incurred by assembling nose-pads to the eyeglass assembly is minimized.

Another objective of the present invention is to provide an eyeglass assembly having a pair of lenses wherein nose-pads thereof do not easily come off and a firmness of the assembled eyeglass assembly is enhanced.

Another objective of the present invention is to provide an eyeglass assembly having a pair of lenses wherein adhesive overflow incurred by assembling nose-pads to the eyeglass assembly is minimized.

Another objective of the present invention is to provide a fabricating method of an eyeglass assembly wherein nose-pads of the eyeglass assembly do not easily come off and a firmness of the assembled eyeglass assembly is enhanced.

Another objective of the present invention is to provide a fabricating method of an eyeglass assembly wherein adhesive overflow incurred by assembling nose-pads to the eyeglass assembly is minimized.

Another objective of the present invention is to provide a fabricating method of an eyeglass assembly having a pair of lenses wherein nose-pads of the eyeglass assembly do not easily come off and a firmness of the assembled eyeglass assembly is enhanced.

Another objective of the present invention is to provide a fabricating method of an eyeglass assembly having a pair of lenses wherein adhesive overflow incurred by assembling nose-pads to the eyeglass assembly is minimized.

Another objective of the present invention is to provide an eyeglass nose-pad for an eyeglass assembly wherein the nose-pads do not easily come off and a firmness of the assembled eyeglass assembly is enhanced.

Another objective of the present invention is to provide an eyeglass nose-pad for an eyeglass assembly wherein adhesive overflow incurred by assembling the nose-pads to the eyeglass assembly is minimized.

Still another objective of the present invention is to provide a lens for an eyeglass assembly wherein nose-pads of the eyeglass assembly do not easily come off and a firmness of the assembled eyeglass assembly is enhanced.

Yet another objective of the present invention is to provide a lens for an eyeglass assembly wherein adhesive overflow incurred by assembling nose-pads to the eyeglass assembly is minimized.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 9 is a flow path illustrating a fabricating method of the eyeglass assembly having the nose-pads according to the present invention; and FIG. 10 is a flow path illustrating another fabricating method of the eyeglass assembly having the nose-pads according to the present invention.

DETAILED DESCRIPTION OF THE PREFERRED EMBODIMENT

While the present invention discloses an eyeglass assembly, it is to be understood that the basic principle relating to the structures of the same has been known to people skilled in the art and needs not to be described herein in detail. Meantime, it is to be stated that the accompanying drawings for being read in conjunction with the following descriptions aim to express structural features related to the characteristics of the present invention and thus are not, and do not need, to be made in scale.

Figure 1:
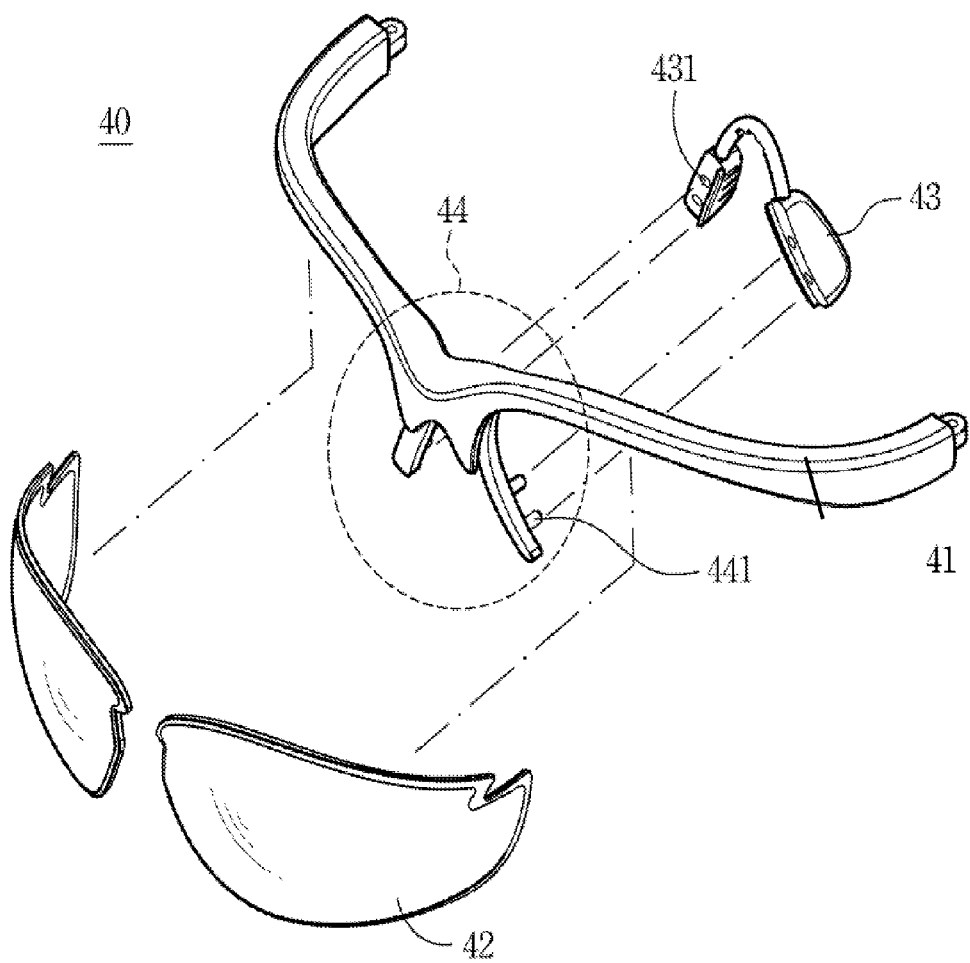
FIG. 1 is an exploded view of a conventional eyeglass assembly.
Figure 2:
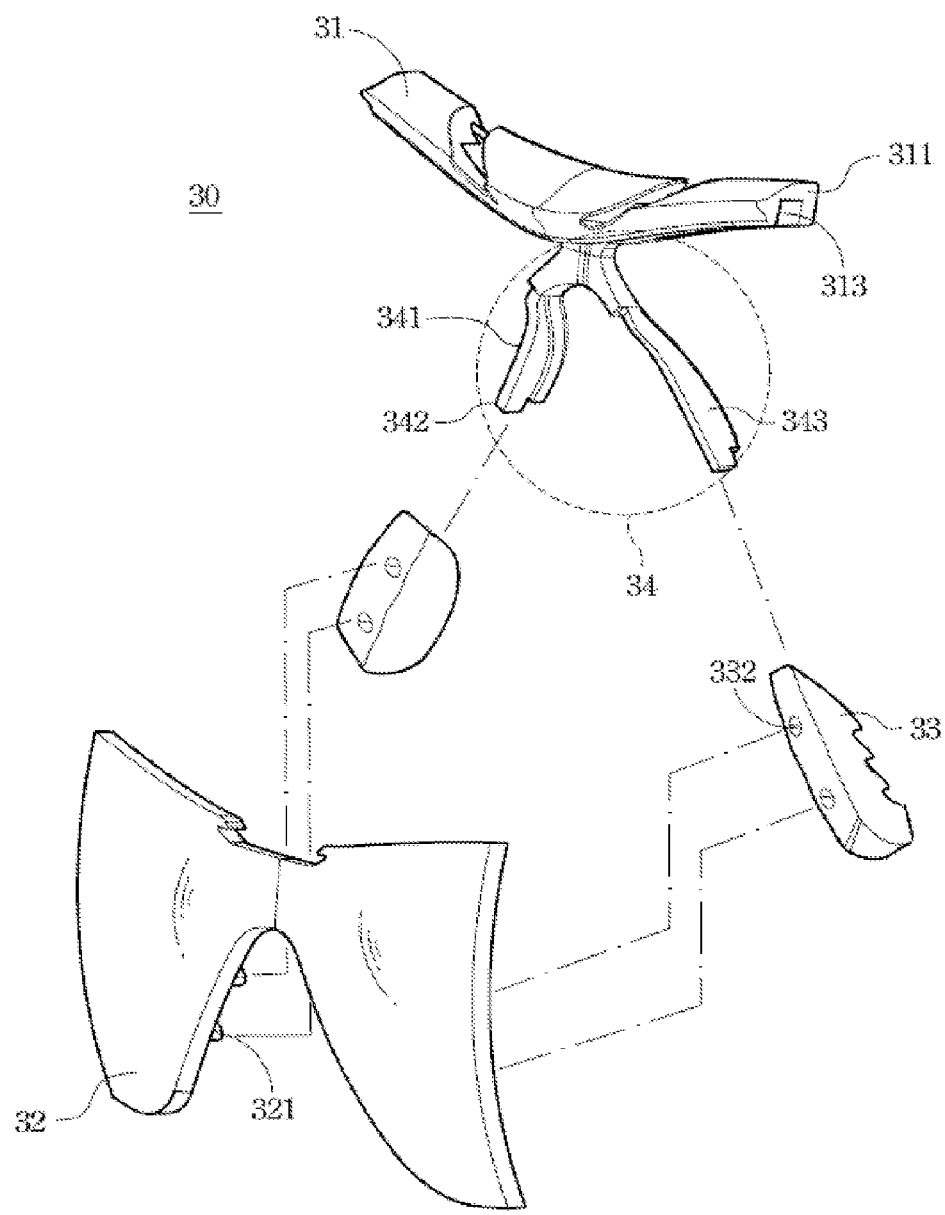
FIG. 2 is an exploded view of an eyeglass assembly of the present invention.

Please refer to FIG. 2 where a first preferred embodiment of the present invention is provided. Therein, an eyeglass assembly 30 is primarily composed of a glass frame 31, a lens 32 and a pair of nose-pads 33. The glass frame 31 has an upper frame member 311 formed with a downward groove 313 for receiving the lens 32. Moreover, a nose bridge 34 extends downward from a center of the upper frame member 311 and has a pair of forks 343. The lens 32 is upwardly assembled to the groove 313 of the upper frame member 311 of the glass frame 31 and has a plurality of protruding columns 321 extending from a lower edge thereof toward the forks 343 of the nose bridge 34 so that accommodating spaces are defined between protruding columns 321 and the nose bridge 34.

Figure 3:
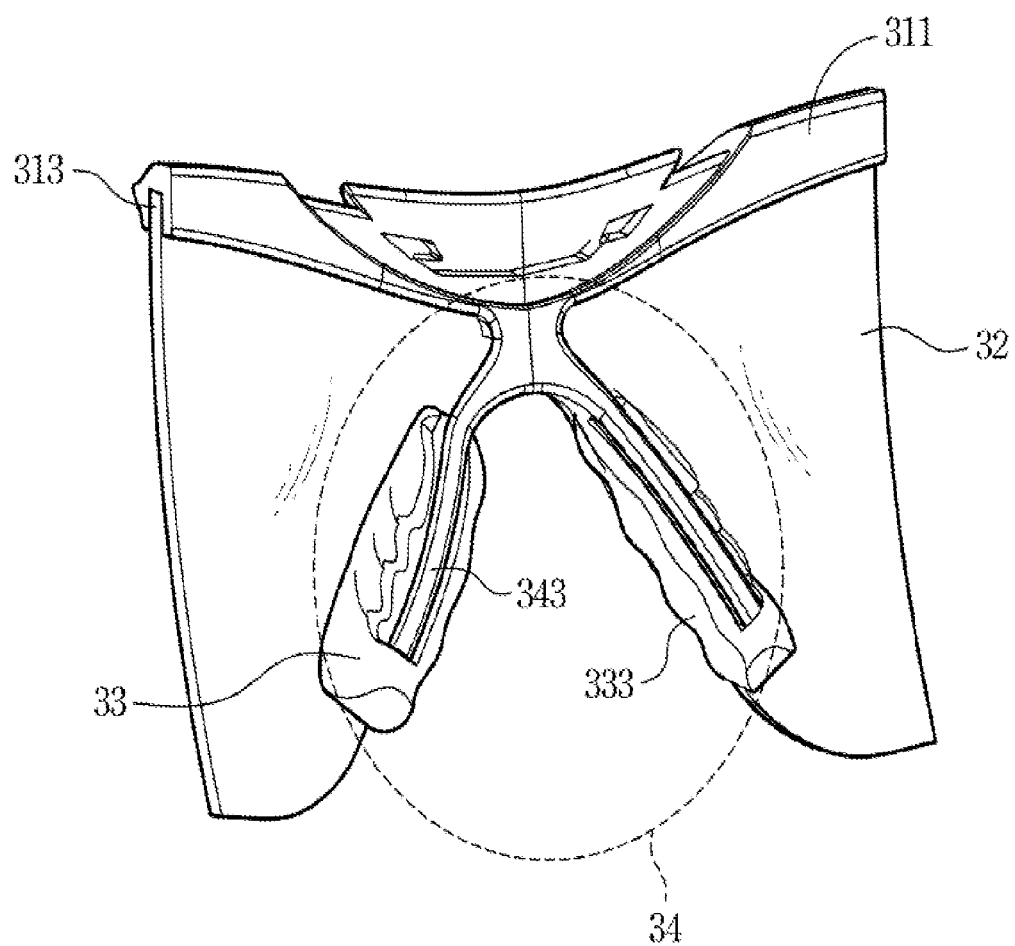
FIG. 3 is a partially enlarged view of a nose bridge of the eyeglass assembly of the present invention.
Figure 4:
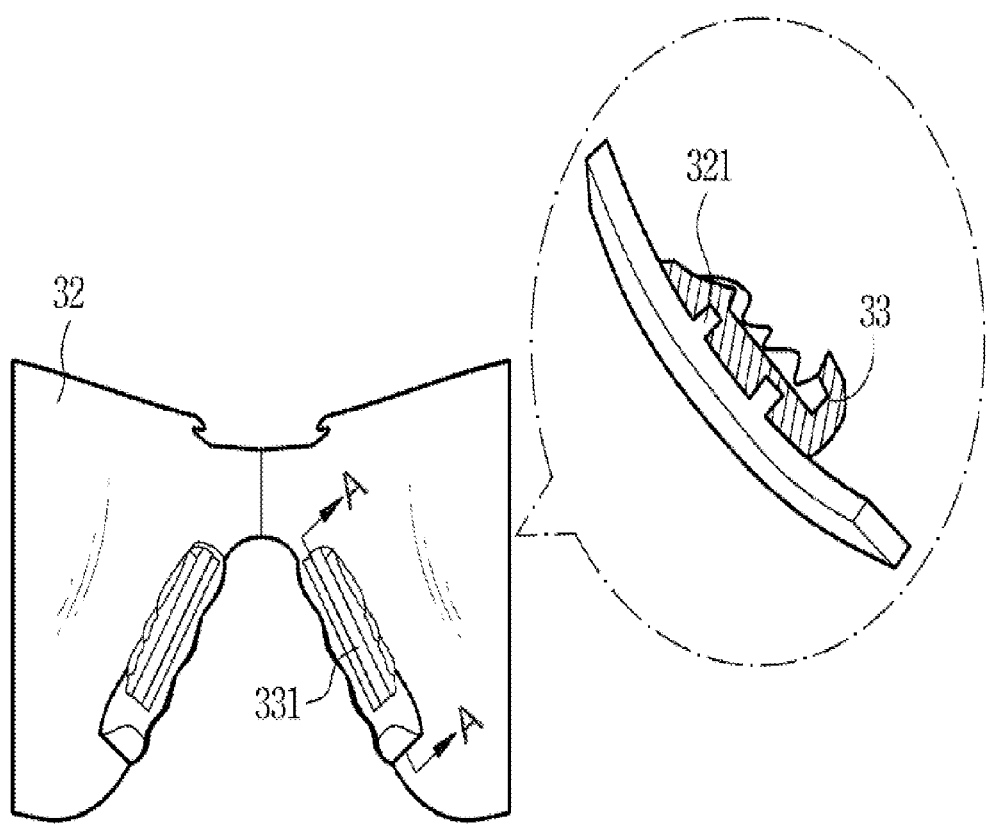
FIG. 4 includes a sectional view of a first aspect of a nose-pad of the eyeglass assembly of the present invention.

Referring to FIGS. 3 and 4, the pair of nose-pads 33 are made of a resilient material and settled in the accommodating spaces. Moreover, each said nose-pad 33 has an opening 331 facing the fork 343 of the nose bridge 34 for receiving the fork 343 and has a plurality of apertures 332 facing the lens 32 for being combined with the protruding columns 321 of the lens 32.

Referring to FIG. 2, in the present embodiment, each of the apertures 332 of the nose-pads 33 is preferably coupled with the corresponding protruding column 321 of the lens 32 in interference-fit. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Figure 7:
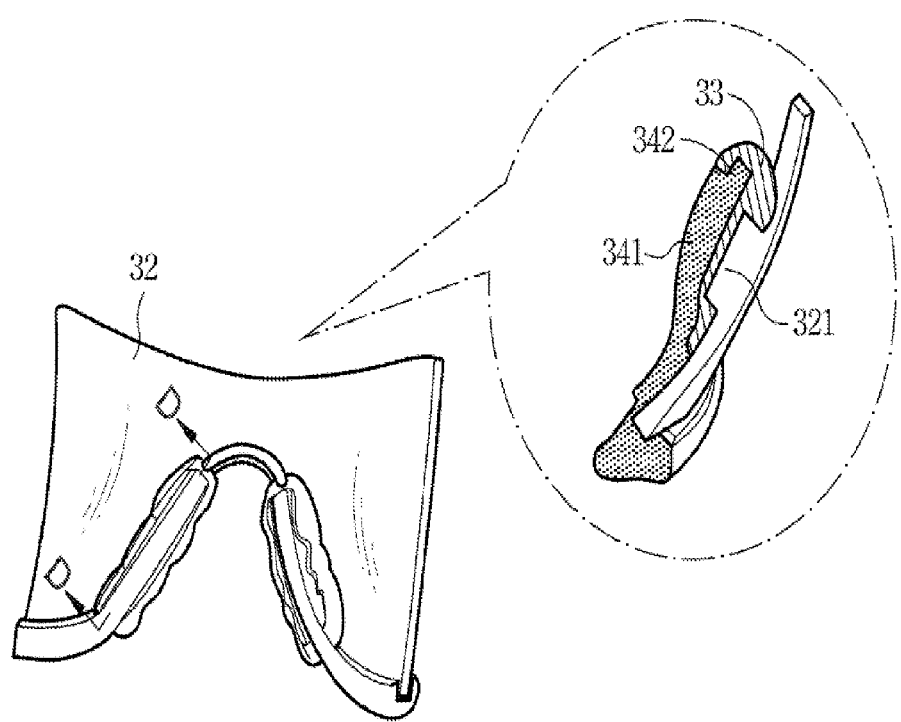
FIG. 7 includes a sectional view of a fourth aspect of the nose-pad of the eyeglass assembly of the present invention.
Figure 8:
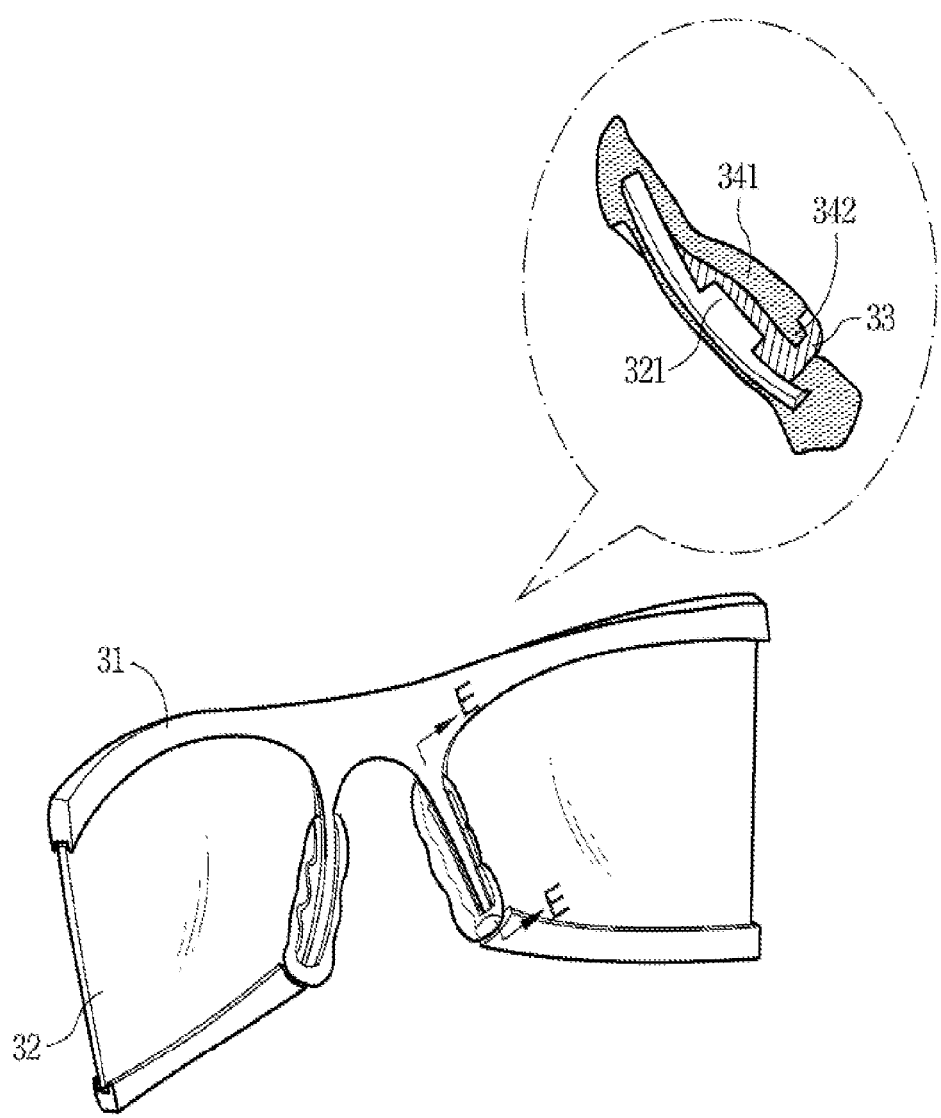
FIG. 8 includes a sectional view of a fifth aspect of the nose-pad of the eyeglass assembly of the present invention.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, as shown in FIGS. 7 and 8, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

For enhancing the firmness of the assembly and preventing the nose-pad 33 from coming off, the plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

Please refer to FIG. 3 again. In each said nose-pad 33, a wavy surface 333 is provided at a side opposite to the side formed with the apertures 332, namely the side to contact a nose ridge of a user to wear the eyeglass assembly, so as to prevent the nose-pad 33 from excessively pressing the user's nose ridge and provide a slight interval between the nose-pad 33 and the user's nose ridge for providing a more comfortable wearing experience.

Figure 5:
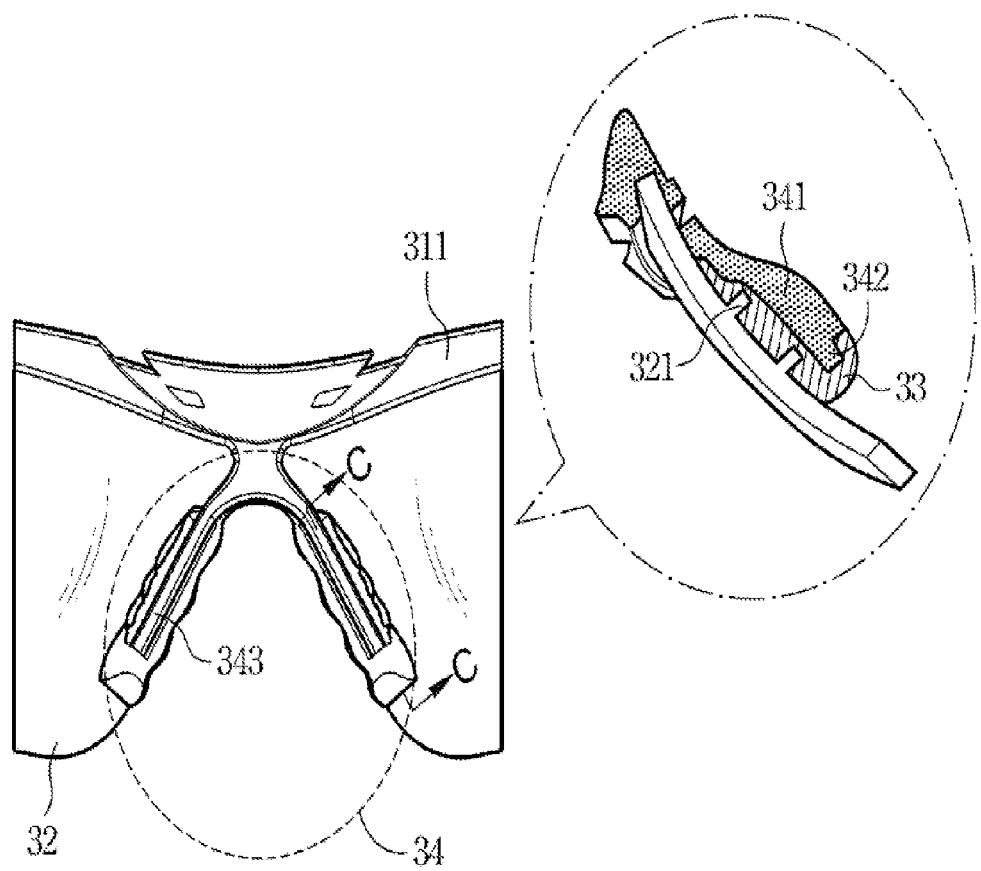
FIG. 5 includes a sectional view of a second aspect of the nose-pad of the eyeglass assembly of the present invention.
Figure 6:
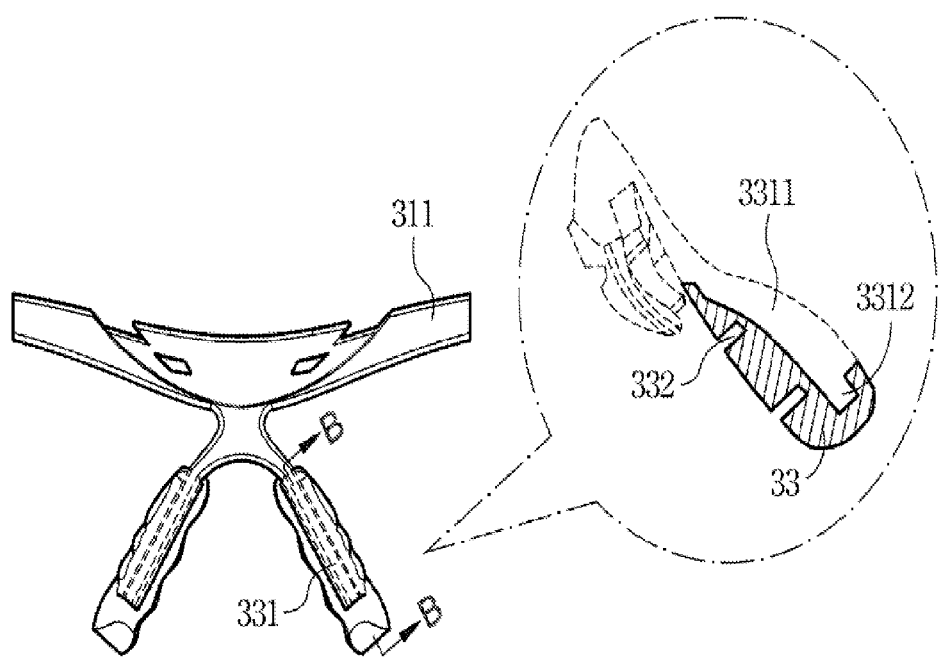
FIG. 6 includes a sectional view of a third aspect of the nose-pad of the eyeglass assembly of the present invention.

Reference is now made to FIGS. 5 and 6. For further firming the assembly and enhancing wearing comfort, in the above embodiment, each of the fork 343 of the nose bridge 34 may have a first prominence 341 extending forward and a second prominence 342 extending outward from an end thereof. In addition, the opening 331 of each said nose-pad 33 may correspondingly have a first seat 3311 and a second seat 3312. Thereby, the second prominence 342 is settled in the second seat 3312 and the other components may be engaged in several ways:

(1) The first prominence 341 has a thickness slightly greater than that of the fork 343 while the opening 331 has a width slightly greater than the thickness of the fork 343 and slightly smaller than the thickness of first prominence 341, so that the first prominence 341 and the opening 331 of the nose-pad 33 are coupled in interference-fit and a buffer gap is formed between the opening 331 and the forks 343;

(2) The first seat 3311 has a width slightly smaller than the width of the opening 331 while the thickness of the fork 343 is slightly greater than the width of the first seat 3311 and slightly smaller than the width of the opening 331, so that the forks 343 and the first seat 3311 are coupled in interference-fit and a buffer gap is formed between the opening 331 and the forks 343; and (3) The first prominence 341 has the thickness slightly smaller than that of fork 343 while the opening 331 has the width slightly greater than the thickness of the fork 343 and the width of the first seat 3311 is slightly smaller than the thickness of the first prominence 341, so that the first prominence 341 and the first seat 3311 are coupled in interference-fit and a buffer gap is formed between the opening 331 and the forks 343.

In the above embodiment, the lens 32 may be integrally formed to have a continuous curved contour. Alternatively, a transitional portion is formed at the center of the lens 32 so that the lens 32 has a discontinuous curved contour. Or, for simplifying the manufacture processes, the lens 32 may be a combination of two separate lenses.

In the above embodiment, the glass frame may be a half-rim frame that only has an upper portion as shown in FIG. 2, or may be a full-rim frame as shown in FIG. 8.

Moreover, for enhancing the firmness of the assembly, the forks 343 of the nose bridge 34 may be pre-bent to descend toward the lens 32 so that when the entire eyeglass assembly is assembled, a resilience provided by the nose bridge 34 can enhance a pressing force acting on the nose-pads 33 so as to improve the firmness of the assembly without increasing assembling complexity.

Please refer to FIG. 9 for a second embodiment of the present invention wherein a fabricating method of an eyeglass assembly is provided. The fabricating method comprising steps of:

providing a glass frame 31 that has an upper frame member 311 formed with a downward groove 313 for receiving a lens 32 and has a nose bridge 34 extending downward from a center of the upper frame member 311 and having a pair of forks 343;

providing the lens 32 that is upwardly assembled to the groove 313 of the upper frame member 311 of the glass frame 31 and has a plurality of protruding columns 321 extending from a lower edge thereof toward the forks 343 of the nose bridge 34 so that accommodating spaces are defined between protruding columns 321 and the nose bridge 34; and providing a pair of nose-pads 33 that is settled in the accommodating spaces and each has an opening 331 facing the fork 343 of the nose bridge 34 for receiving the fork 343 and a plurality of apertures 332 facing the lens 32 for being combined with the protruding columns 321 of the lens 32.

In the above method, each of the apertures 332 of the nose-pads 33 is preferably coupled with the corresponding protruding column 321 of the lens 32 in interference-fit. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

For enhancing the firmness of the assembly and preventing the nose-pad from coming off, the plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

Furthermore, in each said nose-pad 33, a wavy surface 333 is provided at a side opposite to the side formed with the apertures 332, namely the side to contact a nose ridge of a user to wear the eyeglass assembly, so as to prevent the nose-pad 33 from excessively pressing the user's nose ridge and provide a slight interval between the nose-pad 33 and the user's nose ridge for providing a more comfortable wearing experience.

For further firming the assembly and enhancing wearing comfort, in the above embodiment, each of the forks 343 of the nose bridge 34 may have a forward first prominence 341 extending forward and a second prominence 342 extending from an end thereof. In addition, the opening 331 of each said nose-pad 33 may correspondingly have a first seat 3311 and a second seat 3312. Thereby, the second prominence 342 is settled in the second seat 3312 and the other components may be engaged in several ways:

(1) The first prominence 341 has a thickness slightly greater than that of the fork 343 while the opening 331 has a width slightly greater than the thickness of the fork 343 and slightly smaller than the thickness of first prominence 341, so that the first prominence 341 and the opening 331 of the nose-pad 33 are coupled in interference-fit and a buffer gap is formed between the opening 331 and the forks 343;

(2) The first seat 3311 has a width slightly smaller than the width of the opening 331 while the thickness of the fork 343 is slightly greater than the width of the first seat 3311 and slightly smaller than the width of the opening 331, so that the forks 343 and the first seat 3311 are coupled in interference-fit and a buffer gap is formed between the opening 331 and the forks 343; and (3) The first prominence 341 has the thickness slightly smaller than that of fork 343 while the opening 331 has the width slightly greater than the thickness of the fork 343 and the width of the first seat 3311 is slightly smaller than the thickness of the first prominence 341, so that the first prominence 341 and the first seat 3311 are coupled in interference-fit and a buffer gap is formed between the opening 331 and the forks 343.

In the above embodiment, the lens 32 may be integrally formed to have a continuous curved contour. Alternatively, a transitional portion is formed at the center of the lens 32 so that the lens 32 has a discontinuous curved contour. Or, for simplifying the manufacture processes, the lens 32 may be a combination of two separate lenses.

In the above embodiment, the glass frame may be a half-rim frame that only has an upper portion, or may be a full-rim frame.

Moreover, for enhancing the firmness of the assembly, the forks 343 of the nose bridge 34 may be pre-bent to descend toward the lens 32 so that when the entire eyeglass assembly is assembled, a resilience provided by the nose bridge 34 can enhance a pressing force acting on the nose-pads 33 so as to improve the firmness of the assembly without increasing assembling complexity.

Please refer to FIG. 2 where a third preferred embodiment of the present invention is provided. Therein, an eyeglass nose-pad 33 for an eyeglass assembly is settled in an accommodating space between protruding columns 321 of a lens 32 and a nose bridge 34. The nose-pad 33 has an opening 331 facing the fork 343 of the nose bridge 34 for receiving the fork 343 and has a plurality of apertures 332 facing the lens 32 for being combined with the protruding columns 321 of the lens 32.

In the present embodiment, the apertures 332 of each said nose-pad 33 are preferably in interference-fit with the protruding columns 321 of the lens 32. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, as shown in FIGS. 7 and 8, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

For enhancing the firmness of the assembly and preventing the nose-pad from coming off, the plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

Please refer to FIG. 3 again. In each said nose-pad 33, a wavy surface 333 is provided at a side opposite to the side formed with the apertures 332, namely the side to contact a nose ridge of a user to wear the eyeglass assembly, so as to prevent the nose-pad 33 from excessively pressing the user's nose ridge and provide a slight interval between the nose-pad 33 and the user's nose ridge for providing a more comfortable wearing experience.

Reference is now made to FIG. 6. For further firming the assembly and enhancing wearing comfort, the opening 331 of each said nose-pad 33 may further have a first seat 3311 and a second seat 3312 so as to properly mate with the nose bridge 34.

Please refer to FIG. 2 where a fourth preferred embodiment of the present invention is provided. Therein, a lens 32 for an eyeglass assembly 30 is assembled to a groove 313 of a glass frame 31 and has a plurality of protruding columns 321 extending from a lower edge thereof toward a nose ridge of a user to wear the eyeglass assembly. For enhancing the firmness of the assembly and preventing nose-pads 33 from coming off, plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

In the present embodiment, the apertures 332 of each said nose-pad 33 are preferably in interference-fit with the protruding columns 321 of the lens 32. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, as shown in FIGS. 7 and 8, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

In the above embodiment, the lens 32 may be integrally formed to have a continuous curved contour. Alternatively, a transitional portion is formed at the center of the lens 32 so that the lens 32 has a discontinuous curved contour. In addition, the lens 32 may be designed to cover both eyes of a user to wear the eyeglass assembly so that the user can view from a single lens. Or, for simplifying the manufacture processes, the lens 32 may be a combination of two separate lenses so that the user can view from the different lenses.

Please refer to FIG. 7 where a fifth preferred embodiment of the present invention is provided. Therein, a lower-rim eyeglass assembly is primarily composed of a glass frame 31, a lens 32 and a pair of nose-pads 33. The glass frame 31 has a lower frame member 312 formed with an upward groove 313 for receiving the lens 32. Moreover, a nose bridge 34 extends upward from a center of the lower frame member 312 and has a pair of forks 343. The lens 32 is downwardly assembled to the groove 313 of the lower frame member 312 of the glass frame 31 and has a plurality of protruding columns 321 extending from a lower edge of the lens 32 toward the forks 343 of the nose bridge 34 that accommodating spaces are defined between protruding columns 321 and the nose bridge 34. The nose-pads 33 are made of a resilient material and settled in the accommodating spaces. Moreover, each said nose-pad 33 has an opening 331 facing the fork 343 of the nose bridge 34 for receiving the fork 343 and has a plurality of apertures 332 facing the lens 32 for being combined with the protruding columns 321 of the lens 32.

In the present embodiment, the apertures 332 of each said nose-pad 33 are preferably in interference-fit with the protruding columns 321 of the lens 32. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

For enhancing the firmness of the assembly and preventing the nose-pad 33 from coming off, the plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

In addition, in each said nose-pad 33, a wavy surface 333 is provided at a side opposite to the side formed with the apertures 332, namely the side to contact a nose ridge of a user to wear the eyeglass assembly, so as to prevent the nose-pad 33 from excessively pressing the user's nose ridge and provide a slight interval between the nose-pad 33 and the user's nose ridge for providing a more comfortable wearing experience.

For further firming the assembly and enhancing wearing comfort, in the above embodiment, each of the forks 343 of the nose bridge 34 may have a first prominence 341 extending forward and a second prominence 342 extending from an end of the fork 343. Furthermore, the opening 331 of each said nose-pad 33 may further have a first seat 3311 and a second seat 3312. Therein, the second prominence 342 is settled in the second seat 3312 and the other components may be engaged in several ways:

(1) The first prominence 341 has a thickness slightly greater than that of the fork 343 while the opening 331 has a width slightly greater than the thickness of the fork 343 and slightly smaller than the thickness of first prominence 341, so that the first prominence 341 and the opening 331 of the nose-pad 33 are coupled in interference-fit and a buffer gap is formed between the opening 331 and the forks 343;

(2) The first seat 3311 has a width slightly smaller than the width of the opening 331 while the thickness of the fork 343 is slightly greater than the width of the first seat 3311 and slightly smaller than the width of the opening 331, so that the forks 343 and the first seat 3311 are coupled in interference-fit and a buffer gap is formed between the opening 331 and the forks 343; and (3) The first prominence 341 has the thickness slightly smaller than that of fork 343 while the opening 331 has the width slightly greater than the thickness of the fork 343 and the width of the first seat 3311 is slightly smaller than the thickness of the first prominence 341, so that the first prominence 341 and the first seat 3311 are coupled in interference-fit and a buffer gap is formed between the opening 331 and the forks 343.

In the above embodiment, the lens 32 may be integrally formed to have a continuous curved contour. Alternatively, a transitional portion is formed at the center of the lens 32 so that the lens 32 has a discontinuous curved contour.

Please refer to FIG. 10 for a sixth embodiment of the present invention wherein a fabricating method of an eyeglass assembly is provided. The fabricating method of the eyeglass assembly comprising steps of:

providing a glass frame 31 that has a lower frame member 312 formed with an upward groove 313 for receiving a lens 32 and has a nose bridge 34 extending upward from a center of the lower frame member 312 and having a pair of forks 343;

providing the lens 32 that is downwardly assembled to the groove 313 of the lower frame member 312 of the glass frame 31 and has a plurality of protruding columns 321 extending toward the forks 343 of the nose bridge 34 so that accommodating spaces are defined between the protruding columns 321 and the nose bridge 34; and providing a pair of nose-pads 33 that is made of a resilient material and settled in the accommodating spaces wherein each of the nose-pads 33 has an opening 331 facing the fork 343 of the nose bridge 34 for receiving the fork 343 and a plurality of apertures 332 facing the lens 32 for being combined with the protruding columns 321 of the lens 32.

In the above method, the apertures 332 of each said nose-pad 33 are preferably in interference-fit with the protruding columns 321 of the lens 32. Namely, the aperture 332 has a diameter slightly smaller than that of the protruding column 321 so that the two can be combined with excellent firmness without a need of any additional adhesive. Of course, the apertures 332 and the protruding columns 321 may be alternatively combined in clearance-fit. Namely, the aperture 332 has its diameter slightly greater than that of the protruding column 321 so that when the two are assembled, only a small amount of adhesive applied therebetween can result in firm combination thereof.

Besides, each of the apertures 332 of the nose-pads 33 and the corresponding protruding column 321 of the lens 32, which are combined by means of interference-fit or clearance-fit, may be formed in various matching forms. In a preferred embodiment, the aperture 332 of the nose-pad 33 and the protruding column 321 of the lens 32 may be respectively designed as a round hole and a round post having different yet matching diameters or may be respectively designed as an elliptic hole and an elliptic post having different yet matching diameters. Of course, according to another aspect of the present invention, the aperture 332 of the nose-pad 33 and the protruding column 321 of the lens 32 may be respectively designed as a square hole and a square post having different yet matching sizes, or may be respectively designed as a rectangle hole and a rectangle post having different yet matching sizes.

For enhancing the firmness of the assembly and preventing the nose-pad 33 from coming off, the plural apertures 332 of the nose-pad 33 may be arranged in parallel while the plural protruding columns 321 of the lens 32 are not arranged in parallel. Alternatively, the plural apertures 332 of the nose-pad 33 may be not arranged in parallel while the plural protruding columns 321 of the lens 32 are arranged in parallel. Consequently, when the assembly receives an external force, the apertures 332 and the protruding columns 321 move along different directions, so that the nose-pad 33 is efficiently prevented from coming off the lens 32.

Furthermore, in each said nose-pad 33, a wavy surface 333 is provided at a side opposite to the side formed with the apertures 332, namely the side to contact a nose ridge of a user to wear the eyeglass assembly, so as to prevent the nose-pad 33 from excessively pressing the user's nose ridge and provide a slight interval between the nose-pad 33 and the user's nose ridge for providing a more comfortable wearing experience.

For further firming the assembly and enhancing wearing comfort, in the above embodiment, each of the forks 343 of the nose bridge 34 may have a first prominence 341 extending forward and a second prominence 342 extending from an end of the fork 343. In addition, the opening 331 of each said nose-pad 33 may further have a first seat 3311 and a second seat 3312. Therein, the second prominence 342 is settled in the second seat 3312 and the other components may be engaged in several ways:

(1) The first prominence 341 has a thickness slightly greater than that of the fork 343 while the opening 331 has a width slightly greater than the thickness of the fork 343 and slightly smaller than the thickness of first prominence 341, so that the first prominence 341 and the opening 331 of the nose-pad 33 are coupled in interference-fit and a buffer gap is formed between the opening 331 and the forks 343;

(2) The first seat 3311 has a width slightly smaller than the width of the opening 331 while the thickness of the fork 343 is slightly greater than the width of the first seat 3311 and slightly smaller than the width of the opening 331, so that the forks 343 and the first seat 3311 are coupled in interference-fit and a buffer gap is formed between the opening 331 and the forks 343; and (3) The first prominence 341 has the thickness slightly smaller than that of fork 343 while the opening 331 has the width slightly greater than the thickness of the fork 343 and the width of the first seat 3311 is slightly smaller than the thickness of the first prominence 341, so that the first prominence 341 and the first seat 3311 are coupled in interference-fit and a buffer gap is formed between the opening 331 and the forks 343.

In the above embodiment, the lens 32 may be integrally formed to have a continuous curved contour. Alternatively, a transitional portion is formed at the center of the lens 32 so that the lens 32 has a discontinuous curved contour.

Although the particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. An eyeglass assembly, comprising:
    a glass frame, having a frame member formed with a groove for receiving at least one lens, and having a nose bridge downwardly extending from a center of the frame member wherein the nose bridge has a pair of forks;
    at least one said lens, assembled to the groove of the frame member of the glass frame and having a plurality of protruding columns formed toward the forks of the nose bridge wherein accommodating spaces are defined between the protruding columns and the nose bridge; and
    a pair of nose-pads, made of a resilient material and settled in the accommodating spaces, wherein each of the nose-pads has an opening facing the fork of the nose bridge for receiving the fork and a plurality of apertures toward the lens for being combined with the plurality of protruding columns of the lens.

2. The eyeglass assembly according to claim 1, wherein the apertures of the nose-pads and the protruding columns of the lens are coupled in interference-fit.

3. The eyeglass assembly according to claim 1, wherein the protruding columns of the lens are arranged in parallel or not in parallel.

4. The eyeglass assembly according to claim 1, wherein the apertures of the nose-pad are arranged in parallel or not in parallel.

5. The eyeglass assembly according to claim 1, wherein a wavy surface is provided at a side of the nose-pad opposite to the side formed with the apertures.

6. The eyeglass assembly according to claim 1, wherein each of the forks of the nose bridge has a first prominence extending forward and a second prominence extending from an end thereof.

7. The eyeglass assembly according to claim 6, wherein the opening of the nose-pad and the first prominence of the fork of the nose bridge is coupled in interference-fit.

8. The eyeglass assembly according to claim 1, wherein the opening of the nose-pad further has a first seat and a second seat.

9. The eyeglass assembly according to claim 8, wherein the first seat of the nose-pad and the fork of the nose bridge are coupled in interference-fit.

10. The eyeglass assembly according to claim 1, wherein a buffer gap is formed between the opening of the nose-pad and the fork of the nose bridge.

11. The eyeglass assembly according to claim 1, wherein the plural protruding columns of the lens and the plural apertures of the nose-pads each has a sectional shape of a round shape, an elliptic shape, a square shape or a rectangular shape.

12. The eyeglass assembly according to claim 1, wherein the lens has a continuous curved contour.

13. The eyeglass assembly according to claim 1, wherein a transitional portion is formed at the center of the lens so that the lens has a discontinuous curved contour.

14. The eyeglass assembly according to claim 1, wherein the forks of the nose bridge are bent to descend toward the lens.

15. A fabricating method of an eyeglass assembly, comprising:
    providing a glass frame that has a frame member formed with a groove for receiving at least one lens and has a nose bridge extending from a center of the frame member, wherein the nose bridge has a pair of forks;
    providing at least one said lens, assembled to the groove of the frame member of the glass frame and having a plurality of protruding columns formed toward the forks of the nose bridge, wherein accommodating spaces are defined between the protruding columns and the nose bridge; and
    providing a pair of nose-pads, settled in the accommodating spaces, wherein each of the nose-pad has an opening facing the fork of the nose bridge for receiving the fork and a plurality of apertures facing the lens for being combined with the protruding columns of the lens.

16. An eyeglass nose-pad for being assembled between a nose bridge of a glass frame and a lens of an eyeglass assembly, characterized in that:
    the nose-pad is made of a resilient material and formed at one side with an opening for being combined with the nose bridge and at an opposite side with a plurality of apertures for being combined with the lens.

17. The nose-pad according to claim 16, wherein a first seat is formed at a lower edge of the opening and a second seat is formed at an end of the opening.

18. The nose-pad according to claim 16, wherein each of the plural apertures has a sectional shape of a round shape, an elliptic shape, a square shape or a rectangular shape.

* * * * *